United States Patent [19]

Amick

[11] 4,192,920

[45] Mar. 11, 1980

[54] UNIFORM POLYMER BEADS AND ION EXCHANGE RESINS THEREFROM PREPARED BY POST-CROSSLINKING OF LIGHTLY CROSSLINKED BEADS

[75] Inventor: David R. Amick, Chalfont, Pa.

[73] Assignee: Rohm and Haas Company, Philadelphia, Pa.

[21] Appl. No.: 927,195

[22] Filed: Jul. 24, 1978

[51] Int. Cl.$^2$ .................. B01J 1/22; C08F 212/36; C08J 3/24; C08F 212/10
[52] U.S. Cl. ........................................ 521/31; 525/330
[58] Field of Search ............................ 526/17; 521/31

[56] References Cited

U.S. PATENT DOCUMENTS

| | | | |
|---|---|---|---|
| 3,417,066 | 12/1968 | Corte et al. | 521/31 |
| 3,755,281 | 8/1975 | Busby et al. | 526/909 |
| 3,812,061 | 3/1974 | Barrett | 521/31 |
| 3,822,244 | 7/1974 | Peyrot | 526/17 |
| 3,872,067 | 3/1975 | Harris | 521/31 |
| 3,879,328 | 4/1975 | Jones | 260/30.4 R |
| 3,922,255 | 11/1975 | Koestler et al. | 526/293 |

*Primary Examiner*—Joseph L. Schofer
*Assistant Examiner*—Peter F. Kulkosky
*Attorney, Agent, or Firm*—Patrick C. Baker

[57] ABSTRACT

Polymer beads of uniform size are prepared by (a) forming linear polymer beads of a vinyl aromatic polymer containing about 0.8–2.0 chloromethyl groups per aromatic nucleus, (b) removing off-sizes from the linear polymer beads to leave beads of a desired size, (c) recycling the off-sizes into the formation of the linear polymer beads, as required to obtain higher counts of uniform beads, and (d) lightly crosslinking the desired size beads by a thermal treatment to stabilize the beads. Strong base anion exchange resins are produced from the lightly crosslinked beads by swelling the beads in an organic solvent, post-crosslinking the swollen beads with a Friedel-Crafts catalyst, and aminating the post-crosslinked beads. Suitable starting monomers are vinylbenzyl chloride, bis(chloromethyl)styrene and vinyltoluene.

12 Claims, No Drawings

UNIFORM POLYMER BEADS AND ION EXCHANGE RESINS THEREFROM PREPARED BY POST-CROSSLINKING OF LIGHTLY CROSSLINKED BEADS

BACKGROUND OF THE INVENTION

This invention relates to novel polymer beads and ion exchange resins produced therefrom, and to processes for producing the polymer beads and resins in uniform sizes.

Polymer beads which are to be functionalized to provide ion exchange resins are conventionally prepared by polymerization in an aqueous medium of a mixture containing a monovinyl aromatic monomer and a polyvinyl aromatic monomer in an amount effective to crosslink the monovinyl aromatic monomer. Typically, a monomer mixture contains about 50–90% by weight of monovinyl aromatic monomer such as styrene, the balance being a polyvinyl aromatic monomer such as divinylbenzene. The polymerization results in polymer beads having a range of sizes. Although the size range is controllable to some extent by the polymerization conditions a substantial proportion of the beads remains non-uniform, being either larger or smaller in size than what is desired for many uses. Since the beads are crosslinked, they cannot be recycled to the polymerization stage. Accordingly, the fines and oversize beads result in lower useful bead counts and sometimes must be discarded, thus resulting in a substantial economic loss.

A copending, commonly assigned application, U.S. application Ser. No. 927,225, filed July 24, 1978 and incorporated herein by reference, describes the preparation of weak base anion exchange resins by reacting a secondary monoamine with thermally crosslinked vinylbenzyl chloride type polymer beads. The thermal crosslinking results in a low degree or crosslinking (up to about 20% but more usually about 1–5%) such that the beads swell to considerable magnitudes when admixed with a swelling solvent preliminary to amination. The resultant loss of dimensional stability prevents formation of useful strong base ion exchange resins but not weak base ion exchange resins since the secondary amines used to prepare weak base resins will crosslink the beads, thus stabilizing the beads, whereas the tertiary amines will not crosslink, resulting in a product having too low solids for ion exchange use. Hence, when it is desired to use the thermally crosslinked beads as starting materials in the preparation of strong base ion exchange resin, the beads must be modified to prevent undue swelling and consequent loss of dimensional stability.

SUMMARY

A method has now been found whereby polymer losses due to formation of non-uniform polymer bead sizes may be eliminated or minimized. Briefly, in place of initially crosslinking the polymer bead, the polymer beads are maintained in a thermoplastic state and screened to separate the non-uniform beads from the beads having a desired range of sizes. The non-uniform beads are then recycled into the polymerization step, typically by dissolving the non-uniform beads in starting monomer and repolymerizing. When screening of the thermoplastic polymer beads indicates a sufficient count of beads of the desired size range, the beads are then lightly crosslinked via thermal treatment, swollen in an organic solvent and then post-crosslinked by contact with a Friedel-Crafts catalyst. The post-crosslinking prevents undue swelling, thus sufficiently stabilizing the beads so that useful strong base ion exchange resins may be prepared therefrom by reaction with a tertiary amine. The invention thus provides a novel method for producing polymer beads of a uniform size as well as novel strong base anion exchange resins and their precursors.

DETAILED DESCRIPTION

The steps for preparing the uniform anion exchange resin beads and precursor polymer beads may be illustrated as follows:

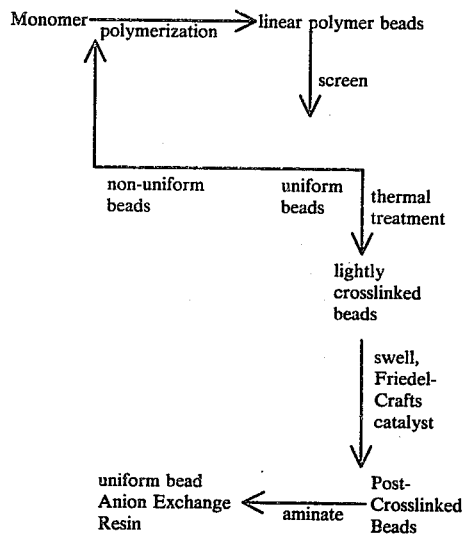

The thermoplastic (substantially linear) polymer bead starting materials are prepared in aqueous dispersion by conventional polymerization techniques, for example, free radical initiated suspension polymerization. Suitable monomers for preparing the polymers are monovinyl aromatic monomers having chloromethyl substituents on the aromatic nuclei, of the order of about 0.8 to about 2.0 chloromethyl groups per aromatic nucleus. Typical monomers of this class are vinylbenzyl chloride and bis(chloromethyl)styrene. These monomers may be polymerized singly or in combination, or in admixture with monovinyl aromatic hydrocarbon monomers provided that at least 50% by weight of the monomer mixture comprises the vinyl aromatic monomers having chloromethyl substituents. Suitable monovinyl aromatic hydrocarbon monomers include styrene, alpha-methyl styrene, vinyltoluene, vinylanisole, and vinylnaphthalene. Alternatively, the chloromethyl substituents may be provided by chlorinating a preformed polymer which is susceptible to chlorination on a benzylic group. Polyvinyltoluene is representative of this type of polymer. Poly(vinylbenzyl chloride) is the preferred polymer, containing about one chloromethyl group per aromatic nucleus.

The polymer beads resulting from the polymerization are then screened, the non-uniform beads being recycled to the polymerization stage as required to obtain the desired range of bead sizes. The beads of desired size are then stabilized by a thermal treatment in the presence of residual free radical initiator. The treatment causes formation of alpha-hydroxy benzylic methylene or benzyloxy crosslinks between aromatic rings of the polymer which carry vinylbenzyl alcohol substituents. The vinylbenzyl alcohol substituents are formed by hydrolysis of a minor proportion of the chloromethyl groups during the initial polymerization. Crosslinks are also formed between the vinylbenzyl alcohol units and other active sites in the polymer. A variety of techniques may be used to effect the thermal crosslinking. If the hydrolysis was insufficient during the polymerization, further hydrolysis may be effected on the polymer beads by suitable adjustment of the pH of the product mixture to the alkaline side. The hydrolysis should provide at least about 0.5% vinylbenzyl alcohol units by weight of the linear polymer bead. While hydrolysis may proceed until about 20% by weight of the polymer comprises vinylbenzyl alcohol units, there is no advantage in proceeding beyond about 0.5–5% by weight hydrolysis.

The conditions of the heat treatment will depend on the decomposition temperature of the free radical initiator and a variety of techniques may be used for the heat treatment. Generally, sufficient crosslinking is achieved by heating at temperatures in the range of about 60° C. to about 95° C. for about 2–8 hours. In one technique the linear addition polymer is separated from the reaction mixture, dried and heated in a vacuum oven. If recycling of the polymer beads to improve size uniformity is not required, the linear polymer beads may be heated in the aqueous dispersion resulting from the polymerization, or the polymer may be separated and redispersed in an inert solvent such as water or isooctane, and then heated. Thermal crosslinking may also be made to occur during the polymerization, if recycling is not to be practiced, by carrying out the polymerization at temperatures somewhat elevated above standard polymerization temperatures, for example, at temperatures above about 70° C., preferably at least about 80° C.

The amount of initiator required to effect the crosslinking during the heat treatment will depend upon the type of initiator as well as the extent of crosslinking desired. From about 0.01% to about 5% by weight of a conventional free radical initiator, based on the weight of linear polymer, will be useful, about 0.5–2% by weight being preferred. An appropriate concentration of initiator may be provided by employing an excess of initiator in the polymerization, such that sufficient unused initiator will be available for the thermal crosslinking. Useful free radical initiators include peroxides, hydroperoxides, percarbonates, azo compounds, and the like, of which the following are representative: benzoyl peroxide, tertiary butyl hydroperoxide, cumene peroxide, tetralene peroxide, acetyl peroxide, caproyl peroxide, tertiary butylperbenzoate, tertiary butyl diperphthalate, methyl ethyl ketone peroxide.

Further description of the thermal crosslinking treatment is set forth in the commonly assigned copending U.S. application identified above, which application is incorporated herein by reference.

The lightly crosslinked polymer beads resulting from the thermal treatment, if blended with an organic solvent conventionally used to swell beads preliminary to amination, would swell too much for successful preparation of strong base ion exchange resins. Undue swelling cannot readily be prevented by higher temperature heat treatment because higher temperatures may cause the beads to stick together and even decompose. Avoidance of such consequences by mild hydrolysis and heat treatment over more extended periods of time is usually impractical and uneconomical. Accordingly, the beads are subjected to a further crosslinking reaction to an extent required to prevent undue swelling and to maintain the dimensional stability of the beads but without crosslinking to such extent as would prevent swelling for effective amination.

It has been discovered that a second (post) crosslinking reaction effective for this purpose comprises reactively contacting the polymer beads while swollen and in a solvent medium with a Friedel-Crafts catalyst. Suitable Friedel-Crafts catalysts include the acidic metal halides, such as aluminum chloride, stannic chloride (preferred), aluminum bromide, boron fluoride, boron fluoride/ethylene oxide adduct, zinc chloride, ferric chloride, antimony chloride, titanium chloride, and the like. The swelling solvent and the solvent selected for the reaction medium may be the same or different but should be a solvent which will not deactivate the Friedel-Crafts catalyst. Suitable solvents include halogenated hydrocarbons such as chlorobenzene, ethylene dichloride, perchloro ethylene, propylene dichloride, and dichlorobenzene; aliphatic hydrocarbons, such as hexane, isooctane and petroleum ether; nitro paraffins such as nitro propane; nitro aromatics such as nitro benzene; and miscellaneous solvents such as carbon disulfide. The aliphatic and cycloaliphatic chlorinated hydrocarbon solvents are preferred as swelling solvents and in some cases also as solvents for the Friedel-Crafts crosslinking. Mixtures of the chlorinated hydrocarbon solvents and the aliphatic hydrocarbon solvents are preferred, such as a 50:50 mixture of ethylene dichloride and hexane. The temperature and duration of the reaction with the Friedel-Crafts catalyst will depend on the catalyst selected and the extent of crosslinking desired. As in the crosslinking by heat treatment, only a slight degree of additional crosslinking is desired, so that the beads will swell sufficiently for effective amination.

The amount of Friedel-Crafts catalyst for the post-crosslinking will depend upon the catalyst and on the conditions of the reaction including solvent, reaction temperature and the extent to which the polymer has already been crosslinked by the thermal treatment. Generally, from about 0.001% to about 1% by weight of catalyst will be effective. The higher amounts or an excess thereover will increase the rate of reaction. The degree of crosslinking should be controlled so that the crosslinked polymer beads will have good dimensional stability in swelling solvents but will swell sufficiently for good amination in the anion functionalization step. Excessive crosslinking will not only prevent sufficient swelling but will also cause excessive loss of chlorine with consequent lower amination capability. The Friedel-Crafts catalyzed reaction results in the formation of methylene crosslinks between the aromatic nuclei. This crosslinking reaction and the subsequent amination with trimethylamine (TMA) to form a strong base resin is illustrated in the following reaction sequence:

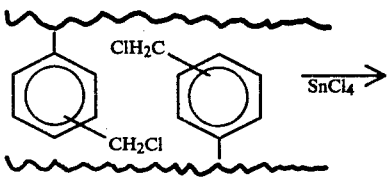

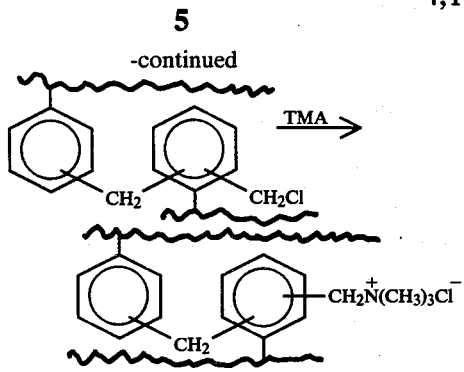

The degree of crosslinking of the polymer beads from the combined thermal and Friedel-Crafts catalyst treatments will be evident in the strong base anion exchange capacities of the resultant ion exchange resins since crosslinking is accompanied by chlorine loss and functionalization can occur only at chlorine sites. Generally, total anion exchange capacities (TAEC) should be at least about 4 meq./g. dry although for some end use applications lower capacities may suffice, e.g., about 3.0–3.75 meq./g. dry.

To some extent the degree of crosslinking can also be followed by chlorine analysis on the Friedel-Crafts crosslinked polymer beads or on the final ion exchange resins. It has been calculated, for example, that about 13% by weight loss of chlorine from the thermally crosslinked polymer beads, due to the Friedel-Crafts catalyst crosslinking, will give a final strong base ion exchange resin having a TAEC of about 4.3 meq./g. dry, and about 20% chlorine loss will give a resin having a TAEC of about 4.08 meq./g. dry. These figures are approximations only, however, since they assume the starting monomer is pure vinylbenzyl chloride (VBC) and no hydrolysis occurs during polymerization. In actual practice the VBC monomer contains minor amounts of other monomer species which amounts can vary from batch to batch of VBC monomer. Accordingly, the only practical measures of degree of crosslinking are TAEC of the final product and percent solids (discussed hereafter).

The percent solids of final, aminated resin beads is another measure of the extent to which the beads have been crosslinked. This is a conventional procedure wherein the resin beads are dispersed and soaked in water under standard conditions of temperature and pressure, equilibrated, and then dried and weighed. The weight of the oven dried resin divided by the weight of the resin before drying times 100 is the percent solids. The procedure is described further on page 31 of "Amberlite Ion Exchange Resins-Laboratory Guide", Rohm and Haas Company publication IE85-65/77, March 1977. The percent solids quantifies the extent to which the final anion exchange resin will absorb water and should be no more than about 65%, preferably not over 45%, for a useful anion exchange resin.

The conditions of amination of the post-crosslinked polymer beads are conventional and result in formation of a strong base ion exchange resin of the gel type. A typical amination is carried out using a non-aqueous solvent system employing ethylene dichloride as swelling solvent, methanol as the major reaction medium, and trimethylamine as the aminating agent. The amine is generally employed in 5–10% excess. Tertiary alkyl amines containing up to about 4 carbon atoms in the alkyl radical of the amines is satisfactory, methyl being preferred. Reaction conditions of about 3 to 12 hours at about 60° to 65° C. are satisfactory. Other amination techniques may also be used. These include aqueous aminolysis with water-soluble amines or reactions in mass with the amine. Isolation of the anion exchange resin is carried out in the usual manner as by filtration, ethanol washing, deionized water washing, azeotropic distillation of residual organics, and further washing with deionized water.

The following examples further illustrate the invention. Throughout the specification and claims all parts and percentages are by weight unless otherwise indicated and the abbreviations have the following meanings: TX-thermally crosslinked; PVBC-poly(vinylbenzyl chloride); EDC-ethylene dichloride; DI- deionized; AER-anion exchange resin; TAEC-total anion exchange capacity; VBC-vinylbenzyl chloride.

EXAMPLE 1

Preparation of TX-PVBC Polymer Beads

To a 1-liter, three-neck roundbottom flask was added an aqueous solution consisting of 1.5 g. of Pharmagel (trademark) protective colloid, 13.3 g. of poly(diallyldimethylammonium chloride) [PADMAC] dispersant, 0.4 g. of boric acid, 0.1 g. of sodium nitrite, 292 g. of DI water, and enough 50% aqueous sodium hydroxide to raise the pH to 10.4. To this was added a solution of 3.1 g. of azoisobutyronitrile (AIBN) in 263 g. of vinylbenzyl chloride. The dispersion was formed using three on-off cycles (2 min. on and 1 min. off) with a stirring rate of 300 rpm. The temperature was raised to 65°; after 20 hr. (nitrogen atmosphere) the reaction was cooled to 25° C. and the polyvinylbenzyl chloride (PVBC) beads were washed with water and then methanol. The air-dried product weighted 261 g. Screening afforded 211 g. of −40/+50 mesh beads (i.e., beads having diameters of 0.29 to 0.36 mm) which were thermally crosslinked by heating 18 hr. at 92° C. in a vacuum oven. The thermally crosslinked beads were used in preparing the resins of Examples 3, 14 and 18.

EXAMPLE 2

Preparation of TX-PVBC Polymer Beads

To a 2-liter, three-neck roundbottom flask was added an aqueous solution consisting of 1.0 g. of "Pharmagel", 9.8 g. of Acrysol (trademark) A-5 dispersant, 300 ml of a 0.17% aqueous Methocel (trademark) solution, 16.6 g. of boric acid, 468 g. of DI water, and enough 50% aqueous sodium hydroxide to raise the pH to 10.3. To this was added a solution of 7.14 g. of t-butyl peroctoate in 800.1 g. of VBC. The dispersion was formed using three on-off cycles with a stirring rate of 220 rpm. The temperature of the stirred nitrogen-purged reaction was increased to 65° C. over 1 hr., held at 65° C. for 6 hrs., and then warmed to 95° and held 2 hrs. The reaction was cooled and filtered. The polyvinylbenzyl chloride beads were washed five times with 1 liter of water, air dried, and screened to provide 776 g. of −20/+100 mesh beads. The 430 g. of −40/+50 mesh beads were thermally treated by heating 16 hrs. at 86° C., and then 16 hrs. at 90° C. in a vacuum oven. The thermally crosslinked beads were used in preparing the resins of Examples 4–13 and 15–17.

EXAMPLE 3

Post-crosslinking and Amination

To a 100 ml, three-neck round bottom flask was added 7.62 g. (0.05 mol.) of the TX-PVBC beads of Example 1 above and a solution of 14.4 ml. of propylene dichloride and 9.6 ml. of isooctane. After swelling for one hour, 0.04 ml. (0.34 mmol; 0.0067 equivalent relative to the TX-PVBC) of Sn Cl₄ was added in one portion while mechanically stirring the slurried resin beads. After 30 minutes the external temperature was increased to 100° C. for 4 hours. The reaction was cooled to 5° C. and 10.5 ml. of methanol was added. After 10 minutes, 5.85 ml. (20% excess) of trimethylamine was added in one portion. The ice bath was removed and after 45 minutes the temperature was increased to 60° C. for 2.25 hours, and then lowered to room temperature for 14 hours. The solvents were removed by distillation (oil bath at 110° C.) while replacing distillate with DI water. The resin beads were collected by filtration and water washed (twice with 50 ml) to yield beads of 44.8 % solids and a total strong base capacity of 4.18 meq./g.dry.

EXAMPLE 4

Post-crosslinking and Amination

To a 1 liter, 3-neck round bottom flask was added 43.0 g. (0.28 mol) of the TX-PVBC beads of Example 2, and a solution of 170 ml. of ethylene dichloride and 170 ml of hexane. After swelling for one hour the reaction was ice-cooled and 3.67 g (0.014 mol; 0.05 equivalent relative to the TX-PVBC) of Sn Cl₄ in 56 ml. of EDC plus 56 ml of hexane was added in one portion, while mechanically stirring the slurried resin beads. The ice bath was removed after one hour and the reaction was warmed to 25° C. The ratio of EDC swelling solvent (ml.) to the TX-PVBC (g.) was 452:43 or 10.5. After 16 hours at 25° C. the reaction was quenched by the addition of 28 ml. of methanol. After 15 minutes the solution was decanted and the resin beads were collected by filtration and washed successively with one liter of methanol, one liter of water, and one liter of methanol. The resin beads were then slurried in 680 ml. of 50% methanolic EDC (v/v). After 15 min. the slurry was ice-cooled and 56 ml. of trimethylamine was added in one portion. After 1 hour at 5° C. and 4 hours at 60° C., the resin beads were collected at 25° C. by filtration and washed with methanol and then water. The resin beads were 44.8% solids, and had a total strong base capacity of 4.29 meq./g. dry.

EXAMPLES 5-18

Table I below summarizes the reaction conditions for swelling of TX-PVBC resin beads and reaction with a Friedel-Crafts catalyst essentially as described in Example 4, including subsequent amination with trimethylamine to form strong base ion exchange resins. The Example 5 polymer could not be aminated to any substantial degree because the low concentration of good swelling solvent (EDC) permitted excessive interchain crosslinking by the Sn Cl₄. The higher solids of Example 7 as compared with the lower solids of Example 8 (the only difference being the higher proportion of good swelling solvent [EDC] in Example 8) also indicates that the crosslinking can be controlled by the swelling power of the solvent system. A comparison of Examples 6 and 7 indicates that higher reaction temperature also causes undesirably high crosslinking (as evidenced by the higher solids and lower capacity of the Example 6 product). Crosslinking also increases with reaction time (compare Examples 7, 10 and 11 or Examples 12, 13 and 14) and with increased catalyst concentration (Compare Examples 7 and 9 or 15 and 16). In Examples 9, 11, 14 and 18 the total calculated chlorine loss was about 13% (based on initial PVBC) and in Examples 7 and 8 the loss was about 20%, corresponding to TAEC values of about 4.30 meq./g. dry and 4.08 meq./g. dry, respectively.

TABLE I

| Example | Swelling Solvent EDC: Hexane (v/v) | Ratio of Swelling Solvent to TX-PVBC [v(ml) /wt(g.)] | Amount of SnCl₄(eq.) Relative to TX-PVBC | Reaction Time (hr.) and Temperature (°C.) | AER Properties | |
|---|---|---|---|---|---|---|
| | | | | | % Solids | TAEC (meq/g.dry) |
| 5 | 25:75 | 10.50 | 0.10 | 8.0/50 | 86.3 | 0.48 |
| 6 | 50:50 | 10.50 | 0.10 | 16.0/50 | 65.7 | 3.13 |
| 7 | 50:50 | 10.50 | 0.10 | 16.0/25 | 56.0 | 4.08 |
| 8 | 67:33 | 10.50 | 0.10 | 16.0/25 | 43.6 | 4.08 |
| 9 | 50:50 | 10.50 | 0.05 | 16.0/25 | 45.3 | 4.30 |
| 10 | 50:50 | 10.50 | 0.10 | 3.0/25 | 32.8 | 4.44 |
| 11 | 50:50 | 10.50 | 0.10 | 5.8/25 | 42.5 | 4.31 |
| 12 | 50:50 | 10.50 | 0.05 | 1.0/55 | 28.6 | 4.62 |
| 13 | 50:50 | 10.50 | 0.05 | 2.0/55 | 39.5 | 4.55 |
| 14 | 50:50 | 10.50 | 0.05 | 3.0/55 | 44.4 | 4.29 |
| 15 | 50:50 | 5.25 | 0.05 | 16.0/25 | 54.6 | 4.36 |
| 16 | 50:50 | 5.25 | 0.025 | 16.0/25 | 45.7 | 4.34 |
| 17 | 50:50 | 10.50 | 0.01 | 16.0/50 | 29.4 | 4.61 |
| 18 | 50:50 | 5.25 | 0.01 | 16.0/60 | 45.1 | 4.30 |

EXAMPLE 19

Recycling to Obtain Uniform Beads

Three generations of linear PVBC beads are prepared via suspension polymerization using a Padmac-Pharmagel aqueous suspension system essentially as described in Example 1. The first generation was made from VBC monomer; the second generation used as its monomer phase VBC in which 20% of the first generation was dissolved; the third generation employed VBC containing 20% of dissolved second generation linear PVBC as the monomer phase. Polymerization conditions were the same for each generation, including a stirring rate of 300 rpm. Table II summarizes the screen analyses relative to monomer phase viscosities.

TABLE II[a]

| Generation | Viscosity of Monomer Phase (cps) | Screen Analysis (% by wt) | | | | | | |
|---|---|---|---|---|---|---|---|---|
| | | 16 | 20 | 30 | 40 | 50 | 60 | 100 |
| 1 | 2.1 | 0.6 | 0.4 | 0.6 | 62 | 10 | — | 25 |
| 2 | 172 | 0.9 | 5.1 | 48.2 | 17.1 | 18.7 | 2.8 | 4.8 |
| 3 | 142 | 1.0 | 17.0 | 45.8 | 13.6 | 14.8 | 2.3 | 3.7 |

[a] Listed as the percentage by weight of the total sample screened which is caught on a sieve of given mesh size after passing through the sieve of next smallest mesh number; e.g., for generation 1, if 100 g. of beads were screened, 97 g. would pass through the 30 mesh sieve of this, 62 g. would be caught on the 40 mesh sieve. The U.S. Standard Sieve series was used (N.A. Lange Handbook, 9th Ed., 1956, page 911).

The data indicate that as the viscosity of the monomer phase is increased (2nd and 3rd generations), the particle size distribution spread increases and the particle size distribution is shifted to larger bead sizes.

Thus, if a −30/+40 mesh bead is the desired TX-PVBC particle size, the first generation would be screened and the 62% of −30/+40 mesh beads would be thermally crosslinked. The other 38% [all the large beads which are retained on the 30 screen (+30) plus those beads which pass through the 40 mesh screen (−40)] can be dissolved in VBC monomer, and this solution can be suspension polymerized, with the new product being screened, again saving the −30/+40 mesh bead fraction. Table II indicates that an increased stirring rate should be used in 2nd and 3rd generations to help offset the effect of increased viscosity on bead size.

I claim:

1. A strong base anion exchange resin produced by lightly crosslinking vinylaromatic polymer beads containing about 0.8–2.0 chloromethyl groups per aromatic nucleus, swelling the beads in an organic solvent post-crosslinking said lightly crosslinked swollen beads by reactive contact with a Friedel-Crafts catalyst, and aminating with a tertiary amine, wherein said lightly crosslinked polymer beads are formed by hydrolyzing said vinylaromatic polymer beads and heating said hydrolyzed beads in aqueous dispersion in the presence of a free radical initiator to obtain up to about 20% crosslinking.

2. The resin of claim 1 wherein said vinylaromatic polymer is poly(vinylbenzyl chloride).

3. The resin of claim 1 wherein said vinylaromatic polymer is chlorinated polyvinyltoluene.

4. The resin of claim 1 wherein said vinylaromatic polymer is bis(chloromethyl)styrene.

5. The resin of claim 1 wherein the tertiary amine is trimethylamine.

6. A process for producing polymer beads of uniform size, comprising:
    (a) forming substantially linear polymer beads of a vinylaromatic polymer containing about 0.8–2.0 chloromethyl groups per aromatic nucleus,
    (b) removing off-size from said linear polymer beads to leave beads of a desired size,
    (c) recycling said off-sizes into the formation of said substantially linear polymer beads by dissolving the off-sizes in the polymerizing mass,
    (d) hydrolyzing said beads of a desired size and heating said hydrolyzed beads in aqueous dispersion in the presence of a free radical initiator to obtain up to about 20% crosslinking, said beads being capable of swelling in an organic solvent without substantially dissolving the beads,
    (e) swelling said beads in an organic solvent and post-crosslinking said swollen beads by reactive contact with a Friedel-Crafts catalyst, and
    (f) aminating said post-crosslinked beads with a tertiary amine.

7. The process of claim 6 wherein said Friedel-Crafts catalyst is stannous chloride.

8. The process of claim 6 wherein said vinylaromatic polymer is poly(vinylbenzyl chloride).

9. The process of claim 6 wherein said vinylaromatic polymer is chlorinated polyvinyltoluene.

10. The process of claim 6 wherein said vinylaromatic polymer is bis(chloromethyl)styrene.

11. The resin of claim 1 wherein at least 50% by weight of the monomer mixture from which the vinylaromatic polymer beads are produced comprises vinyl aromatic monomers having chloromethyl substituents.

12. The process of claim 6 wherein at least 50% by weight of the monomer mixture from which the vinylaromatic polymer beads of step (a) are produced comprises vinyl aromatic monomers having chloromethyl substituents, and said beads in step (d) are hydrolyzed to provide at least about 0.5% vinylbenzyl alcohol units by weight.

* * * * *